United States Patent
Asano et al.

(10) Patent No.: US 6,950,877 B2
(45) Date of Patent: Sep. 27, 2005

(54) PACKET TRANSMISSION SYSTEM IN WHICH PACKET IS TRANSFERRED WITHOUT REPLACING ADDRESS IN THE PACKET

(75) Inventors: Kazuya Asano, Kawasaki (JP); Teruhiko Nagatomo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 09/911,624

(22) Filed: Jul. 25, 2001

(65) Prior Publication Data
US 2002/0161918 A1 Oct. 31, 2002

(30) Foreign Application Priority Data
Apr. 27, 2001 (JP) .................................. 2001-132254

(51) Int. Cl.⁷ .......................................... G06F 15/173
(52) U.S. Cl. ................... 709/238; 709/236; 709/245
(58) Field of Search ................................ 709/236, 238, 709/245; 370/85

(56) References Cited

U.S. PATENT DOCUMENTS

| | | | | |
|---|---|---|---|---|
| 5,309,437 A | * | 5/1994 | Perlman et al. | ............. 370/401 |
| 6,603,769 B1 | * | 8/2003 | Thubert et al. | ............. 370/401 |
| 6,745,243 B2 | * | 6/2004 | Squire et al. | ............. 709/227 |
| 6,778,540 B1 | * | 8/2004 | Ratcliff et al. | ............. 370/401 |

OTHER PUBLICATIONS

Plummer, David C. "An Ethernet Adress Resolution Protocol: RFC 826." Nov., 1982. Network Working Group Request for Comments, No. 826.*

* cited by examiner

*Primary Examiner*—Rupal Dharia
*Assistant Examiner*—Nicholas R. Taylor
(74) *Attorney, Agent, or Firm*—Staas & Halsey LLP

(57) ABSTRACT

In a packet transmission system including host apparatuses and a router which transfers a packet from host apparatuses in a first host group to host apparatuses in a second host group, each host apparatus in the first host group inserts in a packet an IP address and a link-layer address of a destination host apparatus in the second host group before transmitting the packet. When the router receives the packet, the router determines an output port connected to at least one host apparatus in the second host group including the destination host apparatus, based on the IP address of the destination host apparatus inserted in the packet, and transmits the received packet from the determined output port.

10 Claims, 20 Drawing Sheets

| MAC ADDRESS | IP ADDRESS |
| --- | --- |
| aaaaaaaaaaab | 192. 177. 1. 2 |
| aaaaaaaaaaac | 192. 177. 1. 3 |
| bbbbbbbbbbbb | 192. 177. 2. 1 |
| bbbbbbbbbbbc | 192. 177. 2. 2 |
| bbbbbbbbbbbd | 192. 177. 2. 3 |

FIG. 6

| IP ADDRESS | PORT NUMBER |
|---|---|
| 192. 177. 1. x | 1 |
| 192. 177. 2. x | 2 |

FIG. 7

| MAC ADDRESS | IP ADDRESS |
|---|---|
| aaaaaaaaaaab | 192. 177. 1. 2 |
| bbbbbbbbbbbb | 192. 177. 2. 1 |

FIG. 12
PRIOR ART

| MAC ADDRESS | PORT NUMBER |
|---|---|
| aaaaaaaaaaaa | 1 |
| aaaaaaaaaaab | 2 |
| bbbbbbbbbbbb | 3 |

FIG. 13
PRIOR ART

| IP ADDRESS | PORT NUMBER |
|---|---|
| 192. 177. 1. x | 1 |
| 192. 177. 2. x | 2 |

FIG. 16
PRIOR ART

| MAC ADDRESS | IP ADDRESS |
| --- | --- |
| aaaaaaaaaaaa | 192. 177. 1. 1 |
| aaaaaaaaaaab | 192. 177. 1. 2 |
| aaaaaaaaaaac | 192. 177. 1. 3 |
| bbbbbbbbbbbb | 192. 177. 2. 1 |
| bbbbbbbbbbbc | 192. 177. 2. 2 |
| bbbbbbbbbbbd | 192. 177. 2. 3 |

FIG. 17
PRIOR ART

PACKET TRANSMISSION SYSTEM IN WHICH PACKET IS TRANSFERRED WITHOUT REPLACING ADDRESS IN THE PACKET

BACKGROUND OF THE INVENTION

1) Field of the Invention

The present invention relates to a packet transmission system for transmitting a packet between hosts through a router. The present invention also relates to a router and a host used in such a packet transmission system. The present invention further relates to a semiconductor device which is used in the router for realizing desired functions in the router.

2) Description of the Related Art

As a result of the recent progress in computerization, LANs (Local Area Networks) have been constructed in a great number of companies, regardless of their size. Further, since the Internet has been rapidly popularized, home use of LANs is spreading.

When LANs are constructed, devices for transferring packets, such as hubs, L2 (layer 2) switches, routers, and L3 (layer 3) switches, are indispensable constituents of the LANs. In particular, hubs and L2 switches are used only inside respective LANs. The hub is such a device that when a packet is input through one port of a hub, the packet is output from all of the other ports of the hub. Often, each hub also has a function of a repeater. The L2 switch is such a device that when a packet is input through one port of a L2 switch, the L2 switch refers to a link-layer address (MAC address, e.g., Ethernet address), and outputs the packet from one of ports corresponding to the link-layer address. The MAC address is defined in for example, in a LAN in accordance with Ethernet (which is a registered trademark of Xerox Corporation). The router or L3 switch connects a LAN with an external WAN (Wide Area Network), or connects different LAN segments. That is, basically, the router or L3 switch selects a path based on a network-layer address (i.e., IP address). The IP address is defined in the network layer in accordance with the Internet protocol. In this specification, the term "router" is used to refer to either of the router and the L3 switch.

FIG. 11 is a diagram illustrating an example of a configuration of a conventional packet transmission system. In the configuration of FIG. 11, hosts 10 to 12 are connected with each other through an L2 switch 13, and transmit and receive packets. The hosts 10 to 12 belong to an identical subnetwork. The L2 switch 13 receives a packet from one of the hosts 10 to 12, and outputs from one of ports corresponding to a destination of the packet, so that the packet is transferred to the destination among the hosts 10 to 12.

An example of an operation of the conventional packet transmission system of FIG. 11 is explained below. In this example, the host 10 sends a packet to the host 12.

First, the host 10 acquires an IP address of the host 12 as a destination host, and determines an MAC address of the host 12 by referring to an ARP (Address Resolution Protocol) table. An example of an ARP table provided in each host in the configuration of FIG. 11 is illustrated in FIG. 12. In the ARP table of FIG. 12, a MAC address and an IP address of the host 11 and the MAC address and the IP address of the host 12 are stored. Thus, the host 10 acquires the MAC address "bbbbbbbbbbbb" corresponding to the IP address "192.177.2.1" of the host 12 from the ARP table of FIG. 12. Then, the host 10 inserts the IP address and the MAC address acquired from the ARP table, as a destination IP address and a destination MAC address, in a header of the packet, and transmits the packet to the L2 switch 13.

The L2 switch 13 receives the packet transmitted from the host 10, and extracts the destination MAC address from the packet. In this example, the MAC address "bbbbbbbbbbbb" is extracted. Next, the L2 switch 13 refers to a path table as illustrated in FIG. 13, and determines a port corresponding to the extracted MAC address. FIG. 13 is a diagram illustrating an example of the path table provided in the L2 switch 13 in FIG. 11. In the path table of FIG. 13, MAC addresses and corresponding port numbers are stored. Since, in this example, the extracted MAC address is "bbbbbbbbbbbb", the port number "3" is obtained from the path table. That is, the port to which the port number "3" is assigned is connected to the host 12. Thereafter, the L2 switch 13 outputs the packet from the port to which the port number "3" is assigned, and thus the packet is transmitted to the host 12.

When the host 12 receives the packet, the host 12 extracts the destination MAC address from the packet. When the extracted MAC address is identical to the MAC address of the host 12, the host 12 captures the received packet. In all other cases, the host 12 discards the received packet. Since, in this example, the MAC address included in the received packet is identical to the MAC address of the host 12, the host 12 captures the received packet.

Thus, the transfer of the packet from the host 10 to the host 12 is completed.

FIG. 14 is a diagram illustrating an example of a configuration of a conventional packet transmission system which includes a router.

In the configuration of FIG. 14, the hosts 10 to 12 are connected with each other through the L2 switch 13 so that packets are transmitted between the hosts 10 to 12, which belong to an identical subnetwork. The L2 switch 13 transfers each packet transmitted from one of the hosts 10 to 12, to another of the hosts 10 to 12 or a router 14. In addition, the L2 switch 13 transfers each packet transmitted from the router 14, to one of the hosts 10 to 12.

Similarly, the hosts 16 to 18 are connected with each other through the L2 switch 15 so that packets are transmitted between the hosts 16 to 18, which belong to an identical subnetwork. The L2 switch 15 transfers each packet transmitted from one of the hosts 16 to 18, to another of the hosts 16 to 18 or the router 14. In addition, the L2 switch 15 transfers each packet transmitted from the router 14, to one of the hosts 16 to 18.

When the router 14 receives a packet transferred from the L2 switch 13 or the L2 switch 15 through a corresponding port, and the router 14 outputs the packet from a port corresponding to information included in the header of the packet.

FIG. 15 is a diagram illustrating an example of a construction of the conventional router 14 used in the conventional packet transmission system of FIG. 14. The router 14 comprises input/output ports 14a to 14c, a destination-MAC-address extraction unit 14d, a destination-MAC-address comparison unit 14e, a destination-IP-address extraction unit 14f, a path table 14g, an ARP table 14h, a TTL (Time To Live) reduction unit 14i, a MAC-address replacement unit 14j, and a CRC (Cyclic Redundancy Check) re-calculation unit 14k.

The input/output ports 14a to 14c are provided for receiving and outputting packets. In the example of FIG. 14, input/output ports 14a and 14c are respectively connected to the L2 switches 13 and 15. The destination-MAC-address extraction unit 14d extracts a destination MAC address from a header in a packet received through one of the input/output ports 14a to 14c. The destination-MAC-address comparison unit 14e compares the MAC address of the router 14 with the MAC address extracted by the destination-MAC-address extraction unit 14d, and determines whether or not the received packet is addressed to the router 14. The destination-IP-address extraction unit 14f extracts a destination IP address from a header in a packet received through one of the input/output ports 14a to 14c. The path table 14g is a table storing IP addresses of subnetworks and port numbers corresponding to the IP addresses. An example of the path table 14g is indicated in FIG. 16. The ARP table 14h is a table storing IP addresses of hosts and MAC addresses corresponding to the IP addresses. An example of the ARP table 14h is indicated in FIG. 17. The TTL reduction unit 14i reduces a TTL value included in a header in a packet when the packet is transmitted from the router 14, and discards the packet when the TTL value becomes zero. When the destination-MAC-address comparison unit 14e determines that the received packet is addressed to the router 14, the MAC-address replacement unit 14j replaces the destination MAC address in the packet with a MAC address of a destination host. The CRC re-calculation unit 14k re-calculates a CRC code in the packet in which the destination MAC address is replaced by the MAC-address replacement unit 14j, and inserts the CRC code in the packet. The CRC code is provided for checking whether or not data is correctly transmitted.

An example of an operation of the conventional packet transmission system of FIG. 14 is explained below. In this example, the host 10 sends a packet to the host 16, and the hosts 10 and 16 belong to different subnetworks.

First, the host 10 acquires an IP address of the destination host 16. In this example, the IP address "192.177.2.1" is acquired. Next, the host 10 calculates a subnet address of the destination by using a subnet mask. Specifically, the host 10 calculates the subnet address as a logical product of the IP address "192.177.2.1" of the host 16 and the subnet mask "255.255.255.0". In this example, the subnet address "192.177.2.0" is obtained. Next, the host 10 compares the subnet address with the IP address of the host 10, and determines whether or not the destination host 16 belongs to the same subnetwork as the host 10. Since, in this example, the subnet address of the host 10 is "192.177.1.0", and the subnet address of the host 16 is "192.177.2.0", the host 10 determines that the hosts 10 and 16 belong to different subnetworks. In this case, the host 10 inserts the MAC address "cccccccccccc" of the router 14, instead of the MAC address of the host 16, in a header of the packet as a destination MAC address. In addition, the host 10 inserts the IP address "192.177.2.1" of the host 16 in the header as a destination IP address. Further, a TTL value and a CRC code are calculated and inserted in the header. Thereafter, the host 10 transmits the packet to the L2 switch 13.

The L2 switch 13 receives the packet from the host 10, extracts the destination MAC address from the header of the packet, and recognizes that the packet is addressed to the router 14. Therefore, the L2 switch 13 outputs the packet from a port which is connected to the router 14.

The router 14 receives the packet, extracts the destination MAC address from the packet, and determines whether or not the received packet is addressed to the router 14. When the received packet is addressed to the router 14, first, the router 14 reduces the TTL value included in the header by "1". Subsequently, the router 14 extracts the destination IP address "192.177.2.1" from the header of the packet, and calculates a logical product of the extracted destination IP address "192.177.2.1" and the subnet mask "255.255.255.0" in order to obtain a subnet address. Next, the router 14 refers to the path table illustrated in FIG. 16, and determines a port number corresponding to the subnet address obtained as above. Since, in this example, the destination IP address is "192.177.2.1", the subnet address "192.177.2.0" and the port number "2" are obtained. Thereafter, the router 14 refers to the ARP table illustrated in FIG. 17, and acquires a MAC address corresponding to the destination IP address, and replaces the destination MAC address in the packet with the MAC address corresponding to the destination IP address. Since, in this example, the destination IP address is "192.177.2.1", the MAC address "bbbbbbbbbbbb" is obtained corresponding to the destination IP address, and replaces the destination MAC address in the packet. Next, the CRC code for the packet is re-calculated and inserted in the packet. Finally, the packet is output from the port having the determined port number "3".

The L2 switch 15 receives the packet output from the router 14, extracts the destination MAC address from the header of the received packet, and recognizes that the packet is addressed to the host 16. Thus, the packet is output from a port to which the host 16 is connected.

The host 16 receives the packet output from the L2 switch 15, and extracts the destination MAC address from the header of the received packet. Then, the host 16 compares the extracted destination MAC address with the MAC address of the host 16, and recognizes that the received packet is addressed to the host 16. Therefore, the host 16 captures the received packet.

As described above, a packet can be transferred through a router between hosts belonging to different subnetworks.

FIG. 18 is a flow diagram illustrating an example of a sequence of operations performed by each of the hosts in the conventional packet transmission system of FIG. 14 when the host as a source host transmits a packet addressed to another host as a destination host.

In step S10, the source host acquires an IP address of the destination host. In step S11, the source host calculates a logical product of the acquired IP address and a subnet mask "255.255.255.0" in order to obtain a subnet address. In step S12, the source host determines whether or not the destination host belongs to the same subnetwork as the source host. When yes is determined in step S12, the operation goes to step S14. When no is determined in step S12, the operation goes to step S13. In step S13, the source host adopts the MAC address of the router 14 as a destination MAC address. In step S14, the source host adopts the MAC address of the destination host as a destination MAC address. In step S15, the source host adopts the IP address of the destination host as a destination IP address. In step S16, the source host inserts the destination IP address and the destination MAC address in a header of the packet. In step S17, the source host calculates a TTL value and a CRC code, and inserts the TTL value and the CRC code in the header of the packet. In step S18, the source host transmits the packet. Thus, the source host can transmit the packet addressed to a destination host.

FIG. 19 is a flow diagram illustrating an example of a sequence of operations performed by the router in the conventional packet transmission system of FIG. 14 when the router transfers a packet.

In step S20, the router 14 receives a packet through an input/output port. In step S21, the destination-MAC-address extraction unit 14d in the router 14 extracts a destination MAC address from a header in the received packet. In step S22, the destination-MAC-address comparison unit 14e in the router 14 compares the extracted destination MAC address with the MAC address of the router 14, and determines whether or not the received packet is addressed to the router 14. When yes is determined in step S22, the operation goes to step S24. When no is determined in step S22, the operation goes to step S23. In step S23, the router 14 discards the received packet. In step S24, the TTL reduction unit 14i in the router 14 reduces the TTL value included in the header of the received packet. In step S25, the destination-IP-address extraction unit 14f in the router 14 extracts a destination IP address from the header of the received packet. In step S26, the path table 14g in the router 14 calculates a logical product of the acquired destination IP address and a subnet mask "255.255.255.0" in order to obtain a subnet address of a subnetwork to which a destination host belongs. In step S27, the path table 14g in the router 14 determines an input/output port corresponding to the subnet address obtained in step S26. In step S28, the ARP table 14h in the router 14 determines a MAC address corresponding to the destination IP address extracted in step S25. In step S29, the MAC-address replacement unit 14j replaces the existing destination MAC address in the packet with the MAC address determined in step S28. In step S30, the CRC re-calculation unit 14k in the router 14 re-calculates a CRC code for the packet in which the TTL value and the destination MAC address are updated. In step S31, the router 14 outputs the packet from the input/output port determined in step S27. Thus, the router 14 can transfer the packet addressed to a destination host.

FIG. 20 is a flow diagram illustrating an example of a sequence of operations performed by each of the hosts in the conventional packet transmission system of FIG. 14 when the host as a receiver host receives a packet.

In step S40, the receiver host receives a packet. In step S41, the receiver host extracts a destination MAC address from a header of the received packet. In step S42, the receiver host compares the extracted destination MAC address with the MAC address of the receiver host, and determines whether or not the received packet is addressed to the receiver host. When yes is determined in step S42, the operation goes to step S43. When no is determined in step S42, the operation goes to step S44. In step S43, the receiver host captures the received packet. In step S44, the receiver host discards the received packet. Thus, each host can receive a packet transmitted from another host.

However, in the conventional packet transmission system, it is necessary to increase the capacity of the ARP table provided in the router 14 with the number of the connected hosts. Therefore, in order to increase the capacity of the ARP table, the capacity of a storage device provided in the router 14 must be increased with the capacity of the ARP table. Thus, the cost of the router 14 increases.

In addition, when the number of registered information items increases, the search time required for searching for a requested MAC address in the ARP table increases, and therefore the processing speed decreases.

Further, the router must perform processing for replacement of the MAC address, TTL reduction, CRC re-calculation, and the like. However, regardless of whether the functions of the above processing is realized by hardware or software, the manufacturing cost of the router increases, and the packet transfer rate decreases.

SUMMARY OF THE INVENTION

An object of the present invention is to provide a packet transmission system in which the processing speed is not decreased, and hardware resources are not required to be increased.

Another object of the present invention is to provide a host apparatus used in a packet transmission system, which contributes to prevention of decrease in the processing speed and increase in hardware resources in the packet transmission system.

A further object of the present invention is to provide a router apparatus used in a packet transmission system, which contributes to prevention of decrease in the processing speed and increase in hardware resources in the packet transmission system.

According to the first aspect of the present invention, there is provided a packet transmission system comprising at least one first host apparatus belonging to a first host group, at least one second host apparatus belonging to a second host group, and a router which transfers packets between the first at least one host apparatus and the second at least one host apparatus. Each of the at least one first host apparatus in the first host group comprises an insertion unit which inserts in a packet an IP address and a link-layer address of a destination host apparatus of the packet, where the destination host apparatus belongs to the second host group, and a first transmission unit which transmits the packet in which the IP address and the link-layer address are inserted. The router comprises a port determination unit which determines a port connected to the at least one second host apparatus in the second host group based on the IP address inserted in the packet transmitted by the first transmission unit, and a second transmission unit which transmits the packet from the port determined by the port determination unit.

In the packet transmission system according to the first aspect of the present invention, the packet transmission rate in the entire system can be increased, and the size of hardware can be reduced.

The packet transmission system according to the first aspect of the present invention may also have one or any possible combination of the following additional features (i) and (ii).

(i) Each of the at least one first host apparatus in the first host group further comprises a unit which determines whether or not the destination host apparatus belongs to a subnetwork at a first predetermined level in a network hierarchy, based on the IP address of the destination host apparatus and a first subnet mask.

(ii) The router further comprises a unit which determines a subnet address of a subnetwork at a second predetermined level in a network hierarchy to which the destination host apparatus belongs, based on the IP address of the destination host apparatus and a second subnet mask.

According to the second aspect of the present invention, there is provided a packet transmission system, comprising a plurality of host apparatuses; and at least one router which transfers packets between the plurality of host apparatuses. Each of the plurality of host apparatuses comprises a first storage unit which stores IP addresses of host apparatuses belonging to a first subnetwork at a first predetermined level in a network hierarchy and link-layer addresses corresponding to the IP addresses, a first determination unit which determines whether or not a destination host apparatus of a packet belongs to the first subnetwork, a link-layer address acquisition unit which acquires from the first storage unit a link-layer address of the destination host apparatus based on an IP address of the destination host apparatus when the first determination unit determines that the destination host apparatus belongs to the first subnetwork, an insertion unit which inserts in the packet the IP address of the destination host apparatus as a destination IP address and the link-layer address of the destination host apparatus as a destination link-layer address, and a first transmission unit which transmits the packet in which the destination IP address and the destination link-layer address are inserted. Each of the at least one router comprises a plurality of ports each of which is connected to at least one host apparatus, a second storage unit which stores a plurality of identifiers of the plurality of ports and a plurality of subnet addresses of a plurality of second subnetworks at a second predetermined level in a network hierarchy corresponding to the plurality of ports, a reception unit which receives a packet transmitted from a source host, a destination-IP-address extraction unit which extracts a destination IP address from the packet received by the reception unit, a second determination unit which determines one of the plurality of subnet addresses of the plurality of second subnetworks to which the destination IP address extracted by the destination-IP-address extraction unit corresponds, a third determination unit which determines one of the plurality of ports corresponding to the one of the plurality of subnet addresses determined by the second determination unit, by referring to the second storage unit, and a second transmission unit which transmits the packet received by the reception unit, from the one of the plurality of ports determined by the third determination unit.

In the packet transmission system according to the second aspect of the present invention, the packet transmission rate in the entire system can be increased, and the size of hardware can be reduced, compared with the conventional packet transmission system.

The packet transmission system according to the second aspect of the present invention may also have one or any possible combination of the following additional features (iii) and (v).

(iii) The link-layer address is a MAC (Media Access Control) address.

(iv) The first determination unit uses a first subnet mask in order to determine whether or not the destination host apparatus of the packet belongs to the first subnetwork, the second determination unit uses a second subnet mask in order to determine one of the plurality of subnet addresses of the plurality of second subnetworks to which the destination IP address extracted by the destination-IP-address extraction unit corresponds, and the first and second subnet masks have different lengths.

(v) Each of the at least one router comprises a discard unit which discards the packet received by the reception unit, as necessary.

According to the third aspect of the present invention, there is provided a host apparatus for transmitting a packet to a destination host apparatus, comprising: a storage unit which stores IP addresses of host apparatuses belonging to a subnetwork at a predetermined level in a network hierarchy and link-layer addresses corresponding to the IP addresses; a determination unit which determines whether or not the destination host apparatus belongs to the subnetwork; a link-layer address acquisition unit which acquires from the storage unit a link-layer address of the destination host apparatus based on an IP address of the destination host apparatus when the determination unit determines that the destination host apparatus belongs to the subnetwork; an insertion unit which inserts in the packet the IP address of the destination host apparatus as a destination IP address and the link-layer address of the destination host apparatus as a destination link-layer address; and a transmission unit which transmits the packet in which the destination IP address and the destination link-layer address are inserted.

When the host apparatus according to the third aspect of the present invention is used in a packet transmission system, the packet transmission rate in the entire system can be increased, and the size of hardware can be reduced, compared with the conventional packet transmission system.

According to the fourth aspect of the present invention, there is provided a computer-readable storage medium storing a program which makes a computer behave as a host apparatus comprising: a storage unit which stores IP addresses of host apparatuses belonging to a subnetwork at a predetermined level in a network hierarchy and link-layer addresses corresponding to the IP addresses; a determination unit which determines whether or not the destination host apparatus belongs to the subnetwork; a link-layer address acquisition unit which acquires from the storage unit a link-layer address of the destination host apparatus based on an IP address of the destination host apparatus when the determination unit determines that the destination host apparatus belongs to the subnetwork; an insertion unit which inserts in the packet the IP address of the destination host apparatus as a destination IP address and the link-layer address of the destination host apparatus as a destination link-layer address; and a transmission unit which transmits the packet in which the destination IP address and the destination link-layer address are inserted.

When the program stored in the computer-readable storage medium according to the fourth aspect of the present invention is installed in a computer used as a host apparatus in a packet transmission system, the packet transmission rate in the entire system can be increased, and the size of hardware can be reduced, compared with the conventional packet transmission system.

According to the fifth aspect of the present invention, there is provided a router for transferring a packet between a plurality of host apparatuses, comprising: a plurality of ports each of which is connected to at least one host apparatus; a storage unit which stores a plurality of identifiers of the plurality of ports and a plurality of subnet addresses of a plurality of subnetworks at a predetermined level in a network hierarchy corresponding to the plurality of ports; a reception unit which receives a packet transmitted from a source host; a destination-IP-address extraction unit which extracts a destination IP address from the packet received by the reception unit; a subnet-address determination unit which determines one of the plurality of subnet addresses of the plurality of subnetworks to which the destination IP address extracted by the destination-IP-address extraction unit corresponds; a port determination unit which determines one of the plurality of ports corresponding to the one of the plurality of subnet addresses determined by the subnet-address determination unit, by referring to the storage unit; and a transmission unit which transmits the packet received by the reception unit, from the one of the plurality of ports determined by the port determination unit.

When the router according to the fifth aspect of the present invention is used in a packet transmission system, the router can quickly transfer packets, and the hardware size of the router can be reduced, compared with the conventional router.

According to the sixth aspect of the present invention, there is provided a semiconductor device for use in a router having a plurality of ports each of which is connected to at least one host apparatus, and transferring a packet between the host apparatuses. The semiconductor device, when used with the router, makes the router comprise: a storage unit which stores a plurality of identifiers of the plurality of ports and a plurality of subnet addresses of a plurality of subnetworks at a predetermined level in a network hierarchy corresponding to the plurality of ports; a reception unit which receives a packet transmitted from a source host; a destination-IP-address extraction unit which extracts a destination IP address from the packet received by the reception unit; a subnet-address determination unit which determines one of the plurality of subnet addresses of the plurality of subnetworks to which the destination IP address extracted by the destination-IP-address extraction unit corresponds; a port determination unit which determines one of the plurality of ports corresponding to the one of the plurality of subnet addresses determined by the subnet-address determination unit, by referring to the storage unit; and a transmission unit which transmits the packet received by the reception unit, from the one of the plurality of ports determined by the port determination unit.

When the semiconductor device according to the sixth aspect of the present invention is used with a router in a packet transmission system, the router can quickly transfer packets, and the hardware size of the semiconductor device per se and the router can be reduced, compared with the conventional semiconductor device and router.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 6 is a diagram illustrating an example of an ARP table which is provided in each host illustrated in FIGS. 2 and 3;

FIG. 7 is a diagram illustrating an example of a path table which is provided in the router illustrated in FIG. 4;

FIG. 12 is a diagram illustrating an example of an ARP table which is provided in each host illustrated in FIG. 11;

FIG. 13 is a diagram illustrating an example of a path table which is provided in the L2 switch illustrated in FIG. 11;

FIG. 16 is a diagram illustrating an example of a path table which is provided in the router illustrated in FIG. 15;

FIG. 17 is a diagram illustrating an example of an ARP table which is provided in the router illustrated in FIG. 15;

DESCRIPTION OF THE PREFERRED EMBODIMENTS

An embodiment of the present invention is explained in detail below with reference to FIGS. 1 to 10.

(1) Basic Construction

Figure 1:
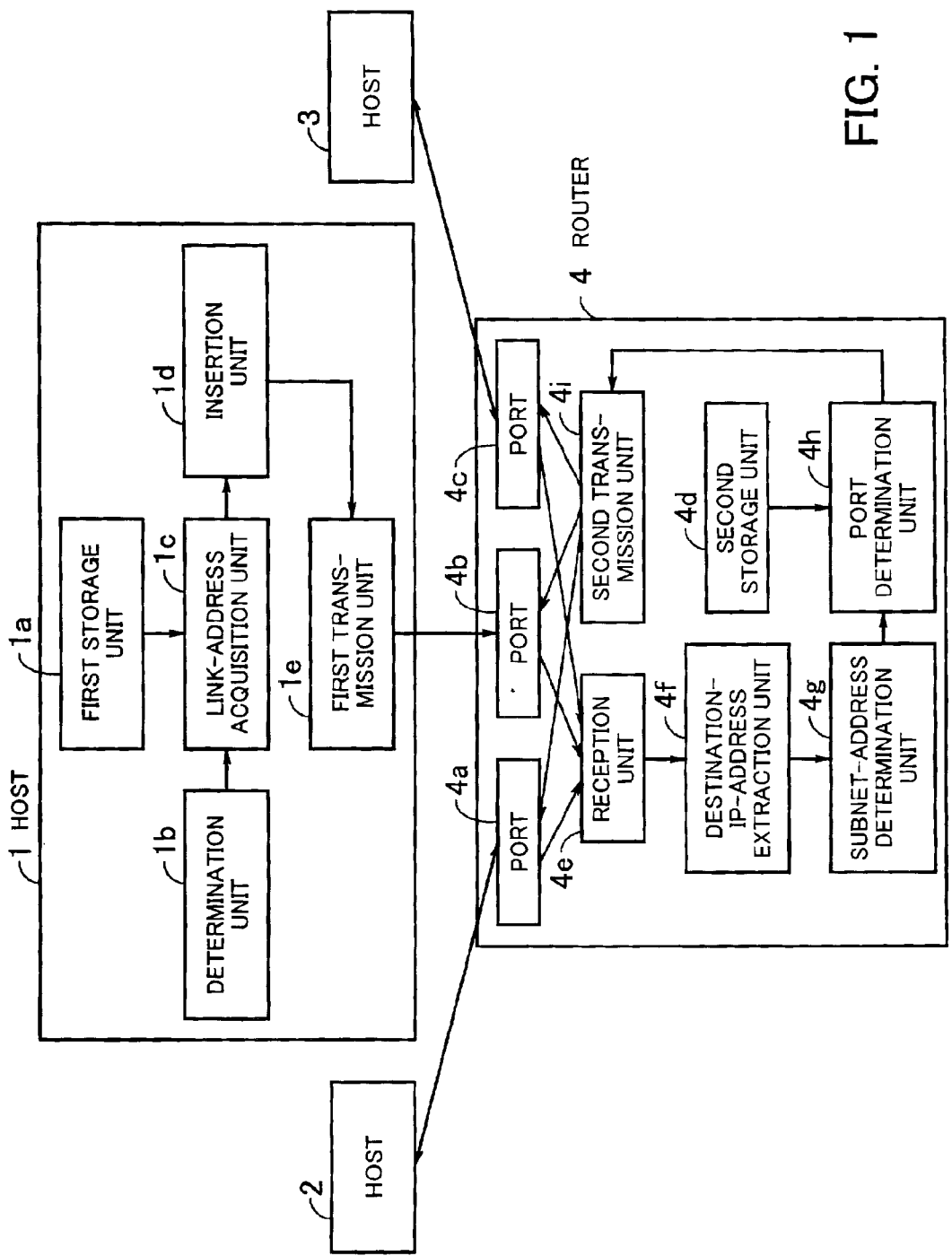
FIG. 1 is a diagram illustrating the principle of the packet transmission system according to the present invention.

FIG. 1 is a diagram illustrating the principle of the packet transmission system according to the present invention. The network system in FIG. 1 comprises hosts 1 to 3 and a router 4. Each of the hosts 1 to 3 transmits a packet to another of the hosts 1 to 3 through the router 4, and receives a packet from another of the hosts 1 to 3 through the router 4. The router 4 receives a packet transmitted from one of the hosts 1 to 3, refers to information inserted in a header of the packet, and transfers the packet to an appropriate one of the hosts 1 to 3.

Each of the hosts 1 to 3 comprises a first storage unit 1*a*, a determination unit 1*b*, a link-address acquisition unit 1*c*, an insertion unit 1*d*, and a first transmission unit 1*e*.

The first storage unit 1*a* stores IP addresses of hosts which belong to a first subnetwork defined at a first predetermined level in a network hierarchy of the packet transmission system, and link-layer addresses (e.g., MAC addresses) of the hosts. Hereinafter, subnetworks defined at the first predetermined level in the network hierarchy are referred to as first-level subnetworks. When a packet is to be transmitted to a destination host, the determination unit 1*b* determines whether or not the destination host belongs to the first subnetwork, based on a first-level subnet address of the first subnetwork. Hereinafter, subnet addresses of (first-level) subnetworks defined at the first predetermined level in the network hierarchy are referred to as first-level subnet addresses. When the determination unit 1*b* determines that the destination host belongs to the first subnetwork, the link-address acquisition unit 1*c* refers to the IP address of the destination host, and acquires from the first storage unit 1*a* a link-layer address corresponding to the IP address of the destination host. The insertion unit 1*d* inserts the IP address of the destination host (as a destination IP address) and the link-layer address of the destination host (as a destination link-layer address) in the header of the packet. The first transmission unit 1*e* transmits the packet in which the destination IP address and the destination link-layer address are inserted.

The router 4 comprises ports 4a to 4c, a second storage unit 4d, a reception unit 4e, a destination-IP-address extraction unit 4f, a subnet-address determination unit 4g, a port determination unit 4h, and a second transmission unit 4i.

The ports 4a to 4c are connected to the hosts 2, 1, and 3, respectively. The second storage unit 4d stores information items (identifiers) for identifying the ports (e.g., port numbers), and second-level subnet addresses to which the respective ports are allocated. Hereinafter, subnetworks defined at a second predetermined level in the network hierarchy are referred to as second-level subnetworks, and subnet addresses of the second-level subnetworks are referred to as second-level subnet addresses. The reception unit 4e receives a packet transmitted from one of the hosts 1 to 3, through one of the ports 4a to 4c corresponding to the one of the hosts 1 to 3. The destination-IP-address extraction unit 4f extracts a destination IP address from the packet received by the reception unit 4e. The subnet-address determination unit 4g determines one of the second-level subnet addresses corresponding to the destination IP address extracted by the destination-IP-address extraction unit 4f. The port determination unit 4h determines one of the ports 4a to 4c corresponding to the second-level subnet address determined by the subnet-address determination unit 4g, by referring to the second storage unit 4d. The second transmission unit 4i transmits the packet from the port determined by the port determination unit 4h.

(2) Operation of Present Invention

As an example, an operation of transmission of a packet from the host 1 to the host 3 according to the present invention is explained below. In this example, it is assumed that the hosts 1 and 3 belong to an identical subnetwork at the first predetermined level (first-level subnetwork) in the network hierarchy, and different subnetworks at the second predetermined level (second-level subnetworks) in the network hierarchy. Specifically, the IP addresses of the hosts 1 and 3 are "192.177.1.1" and "192.177.2.1", respectively.

First, the host 1 acquires the IP address "192.177.2.1" of the host 3 as a destination IP address of a packet. The determination unit 1b in the host 1 calculates a logical product of the acquired IP address "192.177.2.1" and a subnet mask "255.255.0.0", and obtains "192.177.0.0" as a first-level subnet address of the first subnetwork to which the host 3 belongs. Then, the determination unit 1b in the host 1 compares the obtained first subnet address "192.177.0.0" with a subnet address of a subnetwork at the first predetermined level to which the host 1 belongs. Since, in this case, the first-level subnet address of the first-level subnetwork to which the host 1 belongs is "192.177.0.0", which is identical with the first-level subnet address of the first-level subnetwork to which the host 3 belongs, the determination unit 1b in the host 1 determines that the host 3 belongs the same subnetwork as the host 1, and supplies the determination result to the link-address acquisition unit 1c. In this case, the link-address acquisition unit 1c in the host 1 acquires from the first storage unit 1a a link-layer address of the host 3 as a MAC address. Then, the insertion unit 1d in the host 1 inserts in the packet the IP address and the MAC address of the host 3 as a destination IP address and a destination link-layer address. The first transmission unit 1e in the host 1 transmits to the router 4 the packet in which the destination IP address and the destination link-layer address are inserted.

Next, the reception unit 4e in the router 4 receives the packet transmitted from the host 1 through the port 4b. The destination-IP-address extraction unit 4f in the router 4 extracts the destination IP address "192.177.2.1" from the header of the packet received by the reception unit 4e. The subnet-address determination unit 4g in the router 4 calculates a logical product of a subnet mask "255.255.255.0" of the router 4 and the destination IP address "192.177.2.1" extracted by the destination-IP-address extraction unit 4f, and determines "192.177.2.0" as a second-level subnet address of a second-level subnetwork to which the destination host belongs. The port determination unit 4h in the router 4 refers to the information items (identifiers) stored in the second storage unit 4d, and determines as an output port one of the ports corresponding to the second-level subnet address determined by the subnet-address determination unit 4g. In this example, the port 4c corresponding to the second-level subnet address "192.177.2.0" is determined as the output port. The second transmission unit 4i outputs the received packet from the port 4c. At this time, the replacement (conversion) of the MAC address in the packet, the CRC re-calculation, and the TTL reduction are not carried out.

The host 3 receives the packet transmitted from the router 4, and refers to the MAC address, which is inserted in the header of the packet as the destination link-layer address. At this time, the host 3 recognizes that the packet is addressed to the host 3, and captures the packet.

As explained above, in the packet transmission system according to the present invention, a packet is transmitted from a source host through a router to a destination host as follows.

When the destination host belongs to the same first-level subnet address as the source host, the source host inserts in the packet the MAC address of the destination host as the destination link-layer address and the IP address of the destination host as the destination IP address, regardless of the second-level subnet address of the second-level subnetwork to which the destination host belongs. When the router 4 receives the packet, the router 4 calculates the second-level subnet address based on the destination IP address, and outputs the packet from a port corresponding to the calculated second-level subnet address.

That is, the router 4 is not required to perform the processing such as the replacement (conversion) of the MAC address. Therefore, the router 4 can quickly transfer the packet. In addition, since the ARP table, which is necessary for the replacement (conversion) of the MAC address, becomes unnecessary in the router 4, the hardware size of the router 4 can be reduced.

(3) Configuration of Packet Transmission System

Figure 2:
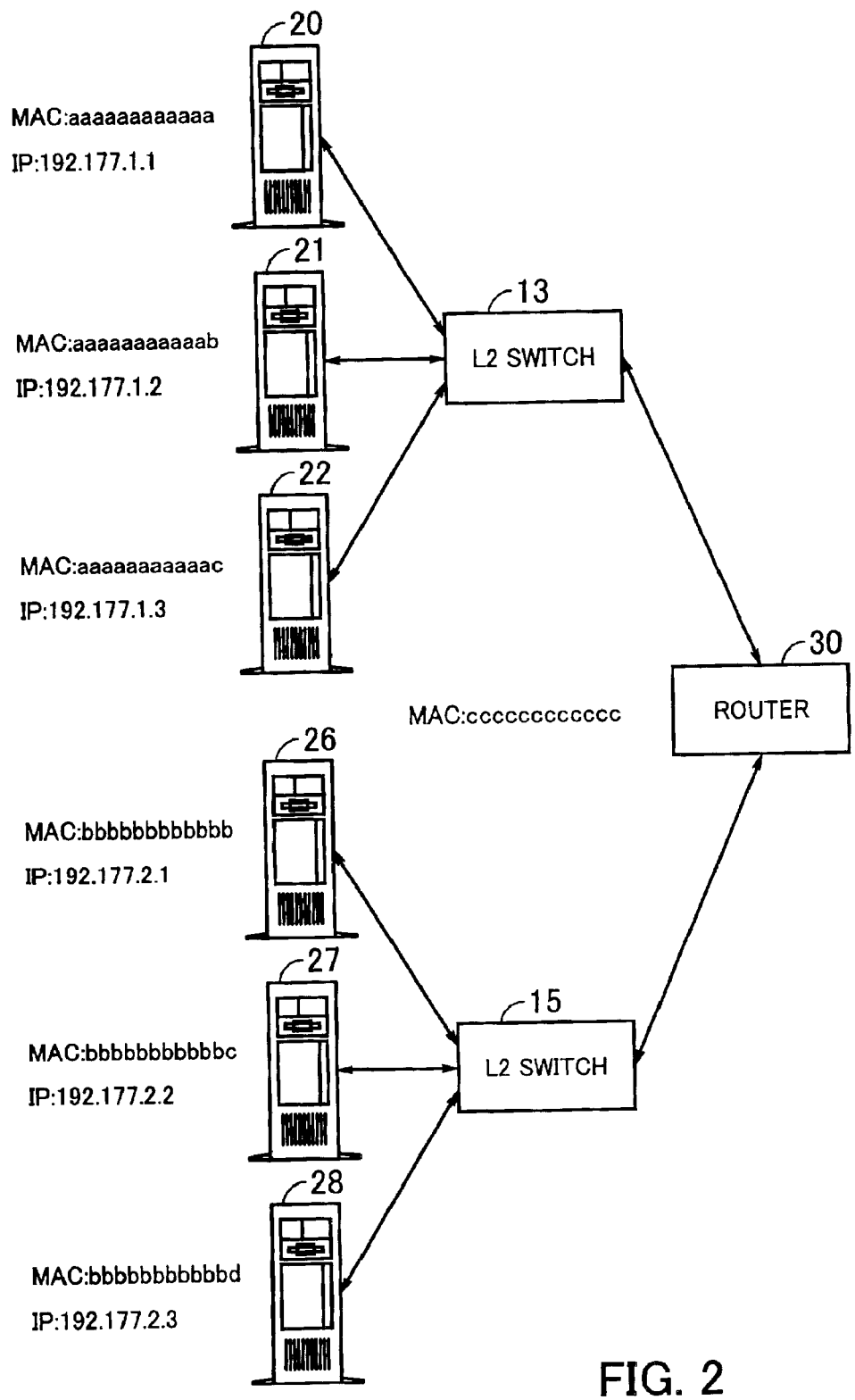
FIG. 2 is a diagram illustrating an example of a configuration of a packet transmission system.

FIG. 2 is a diagram illustrating an example of a configuration of a packet transmission system. The packet transmission system of FIG. 2 comprises hosts 20 to 22, and 26 to 28, L2 switches 13 and 15, and a router 30. Each of the hosts 20 to 22, and 26 to 28 is realized by, for example, a personal computer, and can transmit a packet to another of the hosts 20 to 22, and 26 to 28, and receive a packet transmitted from another of the hosts 20 to 22, and 26 to 28. In this example, the hosts 20 to 22 belongs to a (second-level) subnetwork, and the hosts 26 to 28 belongs to another (second-level) subnetwork.

(4) Hardware Construction of Host

Figure 3:
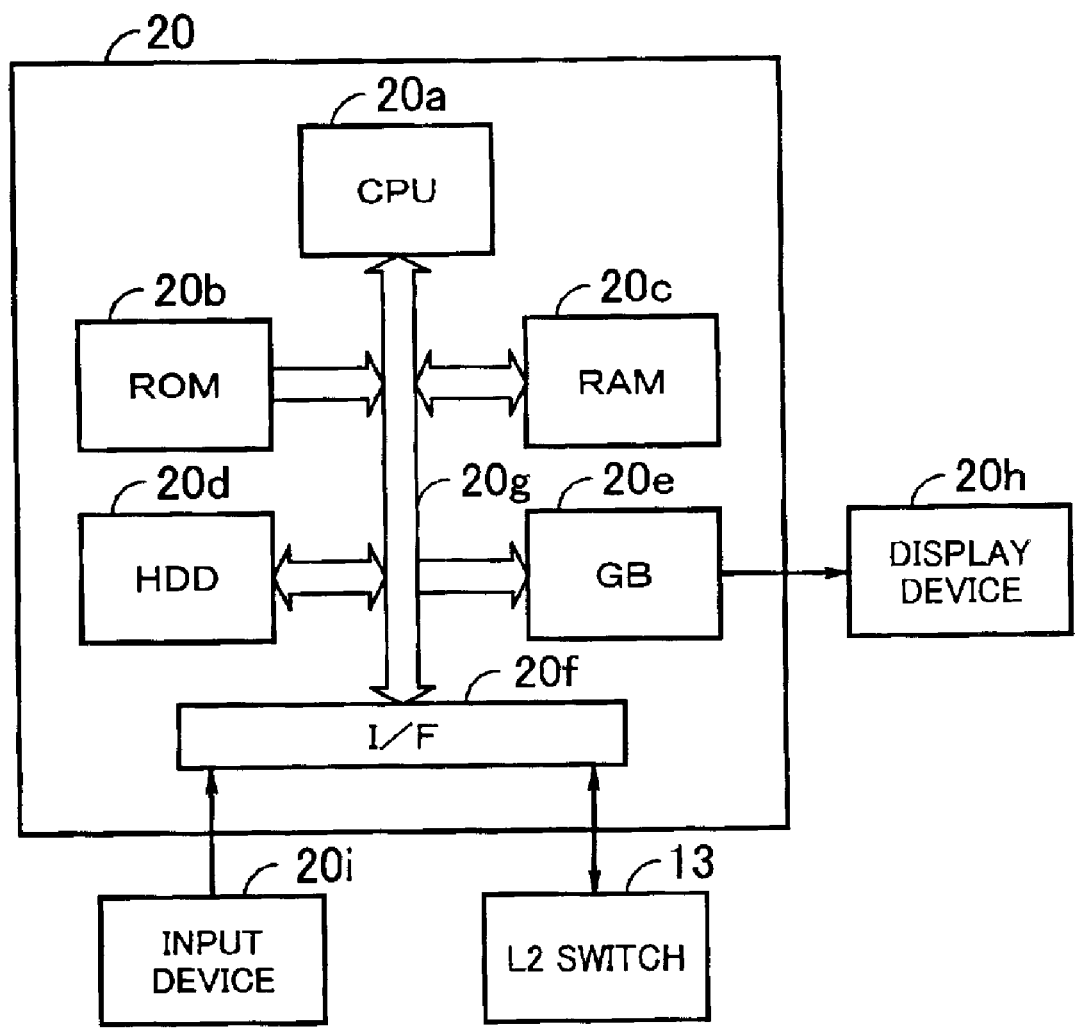
FIG. 3 is a diagram illustrating an example of a hardware construction of each host in the embodiment of the present invention.

FIG. 3 is a diagram illustrating an example of a hardware construction of each of the hosts 20 to 22, and 26 to 28 in an embodiment of the present invention. As illustrated in FIG. 3, each of the hosts 20 to 22, and 26 to 28 comprises a CPU (Central Processing Unit) 20a, a ROM (read-only memory) 20b, a RAM (random access memory) 20c, an HDD (hard disk drive) 20d, a GB (graphics board) 20e, an interface (I/F) 20f, and a bus 20g. In addition, a display device 20h and an input device 20i are externally connected to the host. The CPU 20a controls the respective portions of the host, and performs various calculations in accordance with programs. The ROM 20b stores basic programs which are executed by the CPU 20a, data, and the like. The RAM 20c stores programs currently executed by the CPU 20a, and data which are currently processed. The HDD 20d stores programs executed by the CPU 20a and procedures and data necessary for transmission and reception of packets. The GB 20e executes graphics-drawing processing in response to graphics-drawing instructions or the like which are supplied from the CPU 20a. In addition, the GB 20e transforms an image, which is obtained by the graphics-drawing processing, into an image signal, and supplies the image signal to the display device 20h. The interface 20f converts data forms when data is input from the input device 20i, and makes the protocol conversion or the like when a packet is transmitted to or received from the L2 switch 13 or 15. The bus 20g interconnects the CPU 20a, the ROM 20b, the RAM 20c, the HDD 20d, the GB 20e, and the interface 20f, and enables exchange of information between the CPU 20a, the ROM 20b, the RAM 20c, the HDD 20d, the GB 20e. The display device 20h is realized by, for example, a CRT (cathode ray tube) monitor, and displays an image in accordance with the image signal output from the GB 20e. The input device 20i is realized by, for example, a keyboard and/or a mouse, generates data according to manipulation by a user, and supplies the generated data to the host.

(5) Construction of Router

Figure 4:
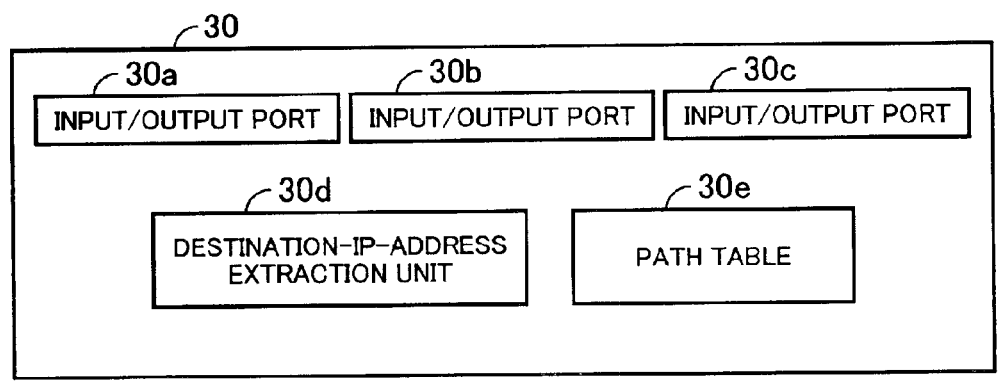
FIG. 4 is a diagram illustrating an example of a construction of the router in FIG. 2.

FIG. 4 is a diagram illustrating an example of a construction of the router 30 in FIG. 2 in the embodiment of the present invention. The router 30 illustrated in FIG. 4 comprises input/output ports 30a to 30c, a destination-IP-address extraction unit 30d, and a path table 30e. The input/output ports 30a to 30c are respectively connected to the L2 switches 13 and 15 and other network constituents such as switches and networks for data transmission to and data reception from the L2 switches 13 and 15 and other network constituents. The destination-IP-address extraction unit 30d extracts a destination IP address from a header of a packet received through one of the input/output ports 30a to 30c. The path table 30e stores a table indicating correspondences between IP addresses and port numbers.

(6) Operations of Embodiment

Figure 5:
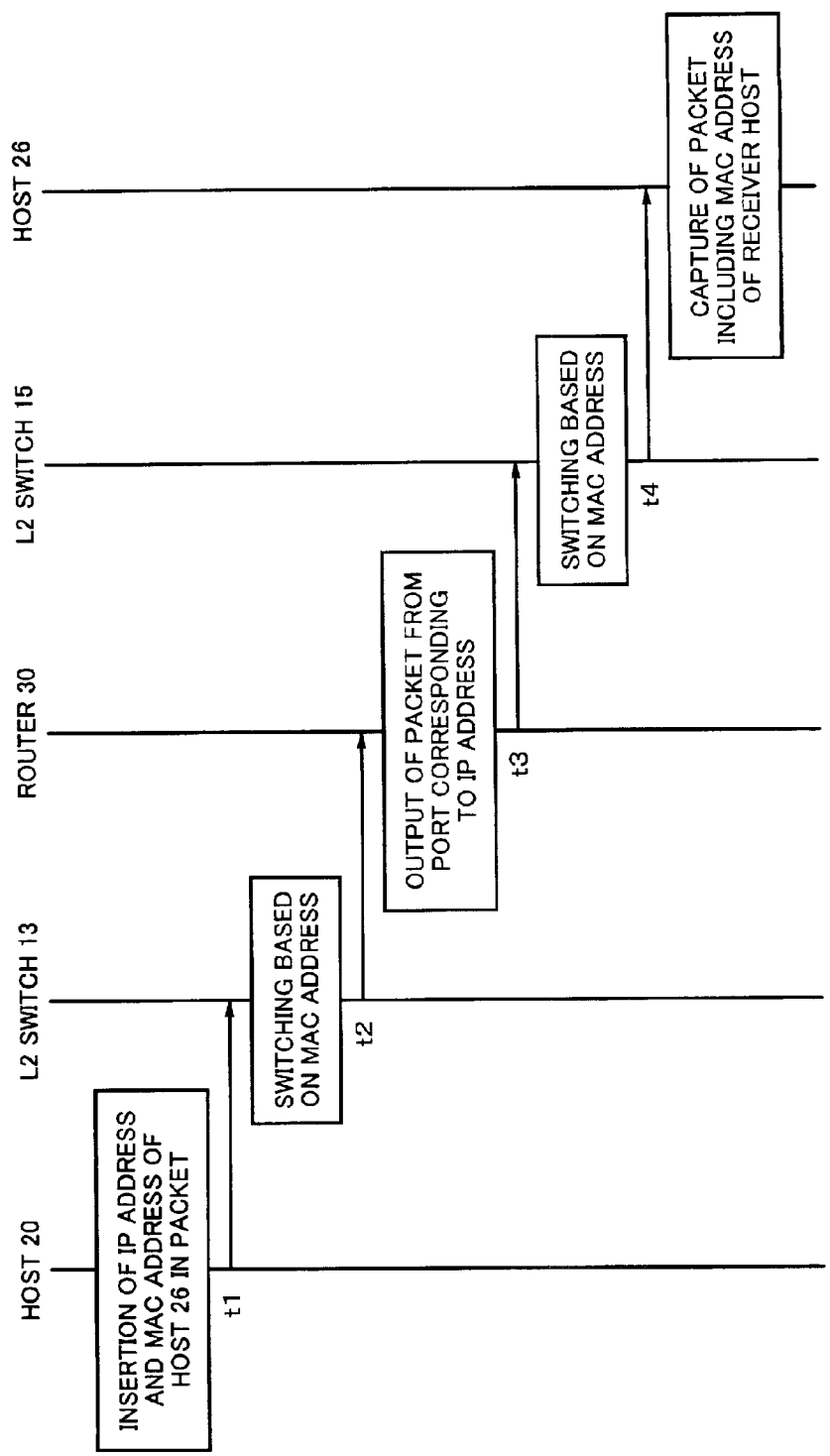
FIG. 5 is a sequence diagram illustrating an example of a sequence of operations of the packet transmission system of FIG. 2.

FIG. 5 is a sequence diagram illustrating an example of a sequence of operations of the packet transmission system of FIG. 2 as the embodiment of the present invention. In the example of FIG. 5, a packet is transmitted from the host 20 to the host 26.

First, the (source) host 20 acquires the IP address of the (destination) host 26, calculates a logical product of the acquired IP address and a subnet mask "255.255.0.0" of the host 20, and obtains a first-level subnet address corresponding to the host 26, i.e., a first-level subnet address of a first-level subnetwork to which the host 26 belongs, where the first-level subnetwork is defined at a first predetermined level in a network hierarchy of the packet transmission system. When the first-level subnet address corresponding to the host 26 is identical to the first-level subnet address corresponding to the host 20, the IP address and the MAC address of the host 26 are inserted in the packet. Since, in this example, the IP address of the host 26 is "192.177.2.1", the first-level subnet address corresponding to the host 26 is "192.177.0.0", which is identical to the first-level subnet address corresponding to the host 20. Therefore, the IP address "192.177.2.1" of the host 26 is inserted in a header of the packet as a destination IP address. In addition, the MAC address "bbbbbbbbbbbb" of the host 26 is acquired from the ARP table as illustrated in FIG. 6, and inserted in the header of the packet as a destination MAC address. Thereafter, at time t1, the packet is transmitted to the L2 switch 13.

When the L2 switch 13 receives the packet, the L2 switch 13 extracts the destination MAC address from the header of the packet, and recognizes that the packet is addressed to the host 26. Therefore, at time t2, the L2 switch 13 transmits the packet to the router 30.

The router 30 receives the packet through the input/output port 30a. The packet is supplied to the destination-IP-address extraction unit 30d, which extracts the destination IP address "192.177.2.1" from the header of the received packet. Then, a logical product of the extracted destination IP address and the subnet mask "255.255.255.0" of the router 30 is calculated in order to obtain a second-level subnet address corresponding to the destination host 26, i.e., a second-level subnet address of a second-level subnetwork to which the host 26 belongs, where the second-level subnetwork is defined at a second predetermined level in the network hierarchy of the packet transmission system. Next, a port number corresponding to the obtained second-level subnet address corresponding to the destination host 26 is obtained from the path table 30e as illustrated in FIG. 7. Since, in this example, the logical product of the extracted destination IP address and the subnet mask "255.255.255.0" of the router 30 is "192.177.2.0", the port number "2" is obtained from the second row of the path table 30e in FIG. 7. When no appropriate port number exists in the path table 30e, the packet is discarded in order to prevent transmission of an unnecessary packet in the network and lowering of the overall transmission rate in the system. Thereafter, at time t3, the router 30 outputs the above packet from the input/output port 30b corresponding to the obtained port number "2".

The L2 switch 15 receives the packet output from the router 30, and extracts the destination MAC address from the header of the packet. Thus, the L2 switch 15 recognizes that the packet is addressed to the host 26, and outputs the packet from one of the ports which is connected to the host 26, at time t4. Thus, the packet is sent to the host 26.

When the host 26 receives the packet, the host 26 extracts the destination MAC address from the header of the packet, and compares the extracted destination MAC address with the MAC address of the host 26. When it is determined that the extracted destination MAC address is identical to the MAC address of the host 26, the host 26 recognizes that the packet is addressed to the host 26, and captures the packet.

According to the above sequence of operations, packets can be transferred between hosts belonging to different subnetworks (i.e., between the host 20 and the host 26) without performing the replacement (conversion) of the MAC address in the packets, the CRC re-calculation, and the TTL reduction. Therefore, the number of processing steps which are required to be executed by the router 30 can be reduced, and the router 30 can quickly transfer the packets. In addition, since the packet transfer operation is performed by referring to only the destination IP address, it is unnecessary to provide an ARP table in the router 30, and possible to reduce the hardware size of the router 30. Further, it is sufficient for the path table to have a capacity corresponding to the number of the ports. Therefore, even when the number of hosts connected to the network increases, the operation of referring to the path table can be performed in a short time, and the hardware size of the router can be reduced.

Details of the operations performed by each of the source host 20, the router 30, and the host 26 are explained below with reference to FIGS. 8, 9, and 10.

(7) Sequence of Source Host

Figure 8:
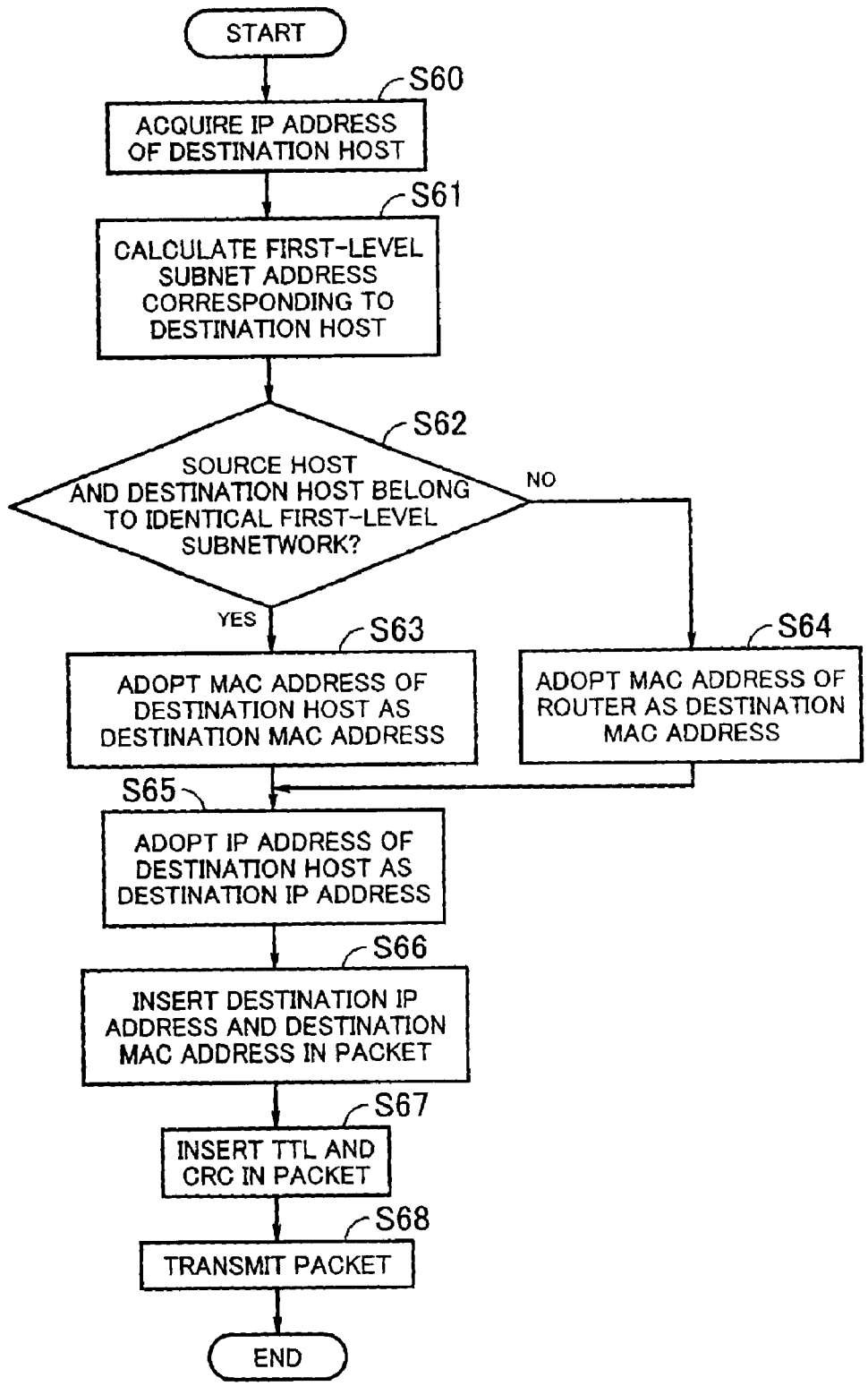
FIG. 8 is a flow diagram illustrating an example of a sequence of operations performed by a host in the embodiment of the present invention when the host transmits a packet addressed to another host.

FIG. 8 is a flow diagram illustrating an example of a sequence of operations performed by each of the hosts 20 to 28 (in FIG. 2) when the host transmits a packet addressed to another of the hosts 20 to 28. In the following explanation, the host which transmits the packet is referred to as a source host.

In step S60, the CPU 20a of the source host acquires an IP address of a destination host. In step S61, the CPU 20a of the source host calculates a logical product of the IP address acquired in step S60 and the subnet mask "255.255.0.0" of the host in order to obtain the first-level subnet address corresponding to the destination host. In step S62, the CPU 20a of the source host determines whether or not the first-level subnet address corresponding to the destination host is identical to the first-level subnet address corresponding to the source host. When yes is determined in step S62, the operation goes to step S63. When no is determined in step S62, the operation goes to step S64. In step S63, the CPU 20a of the source host refers to the ARP table illustrated in FIG. 6, acquires the MAC address of the destination host, and adopts the MAC address of the destination host as a destination MAC address. The ARP table is stored in the HDD 20d. In step S64, the CPU 20a of the source host adopts the MAC address of the router as a destination MAC address. In step S65, the CPU 20a of the source host adopts the IP address of the destination host as a destination IP address. In step S66, the CPU 20a of the source host inserts the destination IP address and the destination MAC address in a header of the packet. In step S67, the CPU 20a of the source host calculates a TTL value and a CRC code, and inserts the TTL value and the CRC code in the header of the packet. In step S68, the CPU 20a of the source host transmits the packet generated as above. Thus, the sequence of operations of the source host for transmitting a packet is completed.

(8) Sequence of Router

Figure 9:
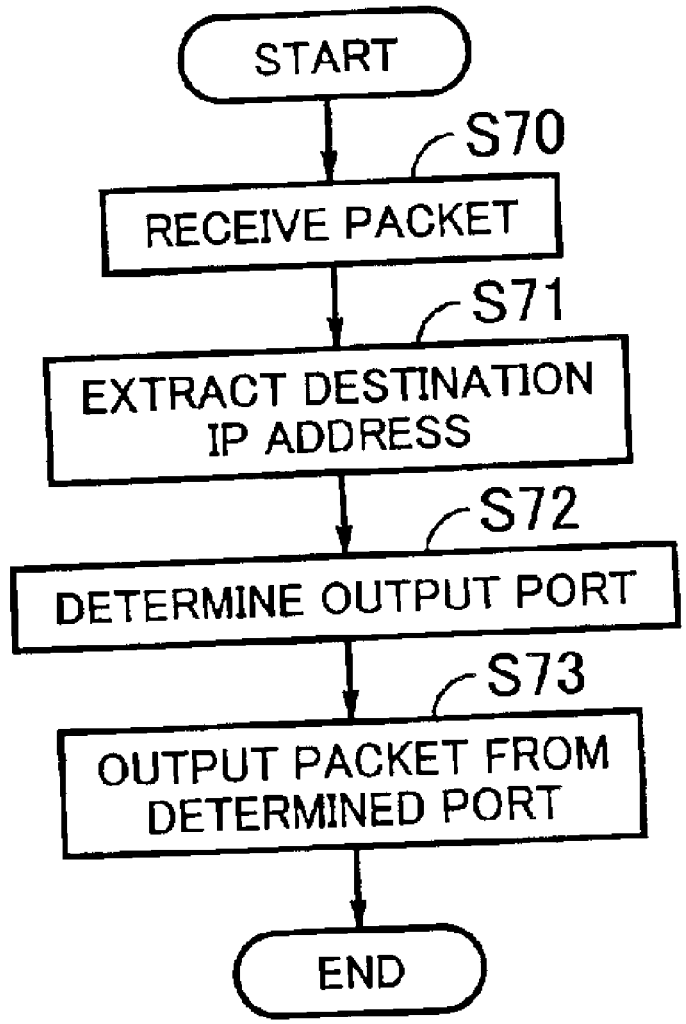
FIG. 9 is a flow diagram illustrating an example of a sequence of operations performed by a router in the embodiment of the present invention when the router transfers a packet.

FIG. 9 is a flow diagram illustrating an example of a sequence of operations performed by the router 30 when the router 30 transfers a packet.

In step S70, the router 30 receives a packet through one of the input/output ports 30a to 30c. In step S71, the destination-IP-address extraction unit 30d in the router 30 extracts a destination IP address from the received packet. In step S72, the path table 30e in the router 30 calculates a logical product of the extracted destination IP address and a subnet mask of the router in order to obtain a second-level subnet address corresponding to the destination host, and determines as an output port one of the input/output ports 30a to 30c corresponding to the obtained second-level subnet address. In step S73, the router 30 outputs the received packet from the output port determined in step S72. Thus, the sequence of operations of the router 30 for transferring a packet is completed.

(9) Sequence of Destination Host

Figure 10:
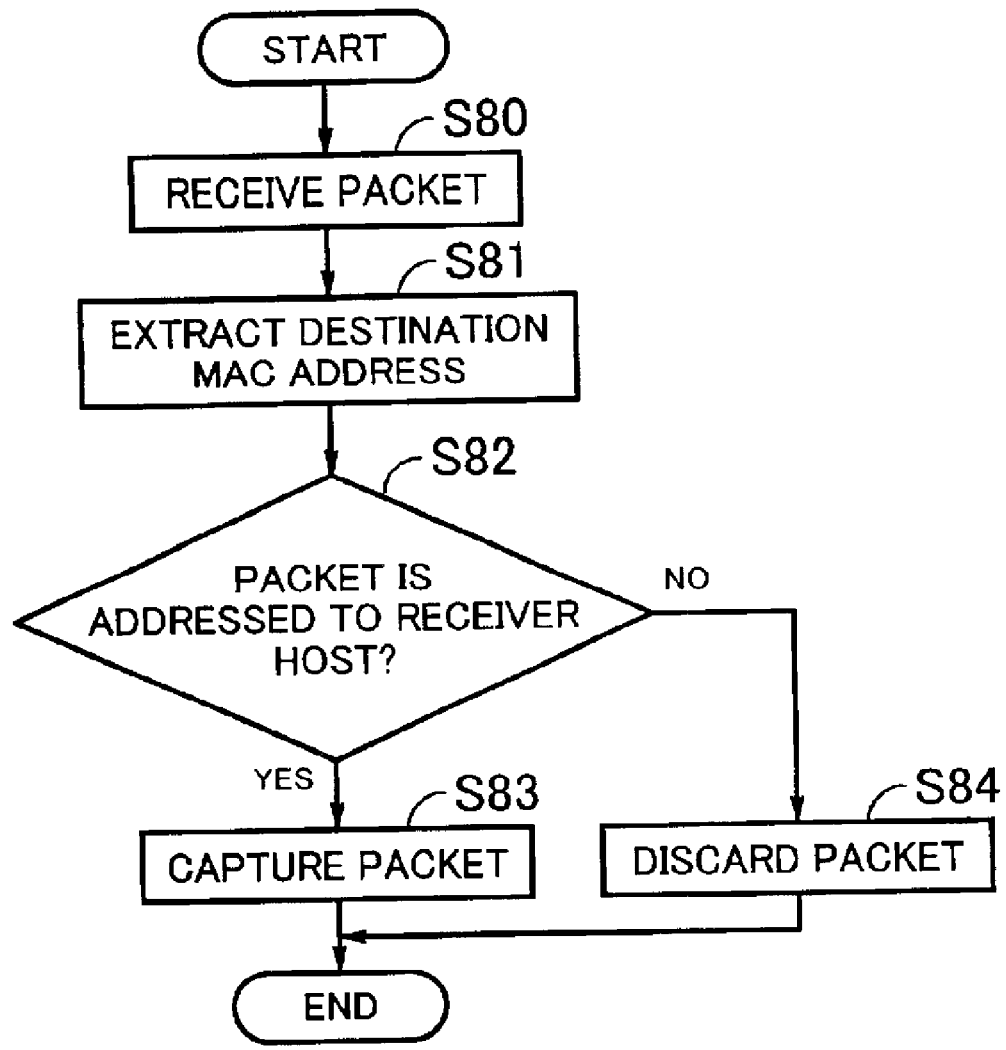
FIG. 10 is a flow diagram illustrating an example of a sequence of operations performed by a host in the embodiment of the present invention when the host receives a packet.
Figure 11:
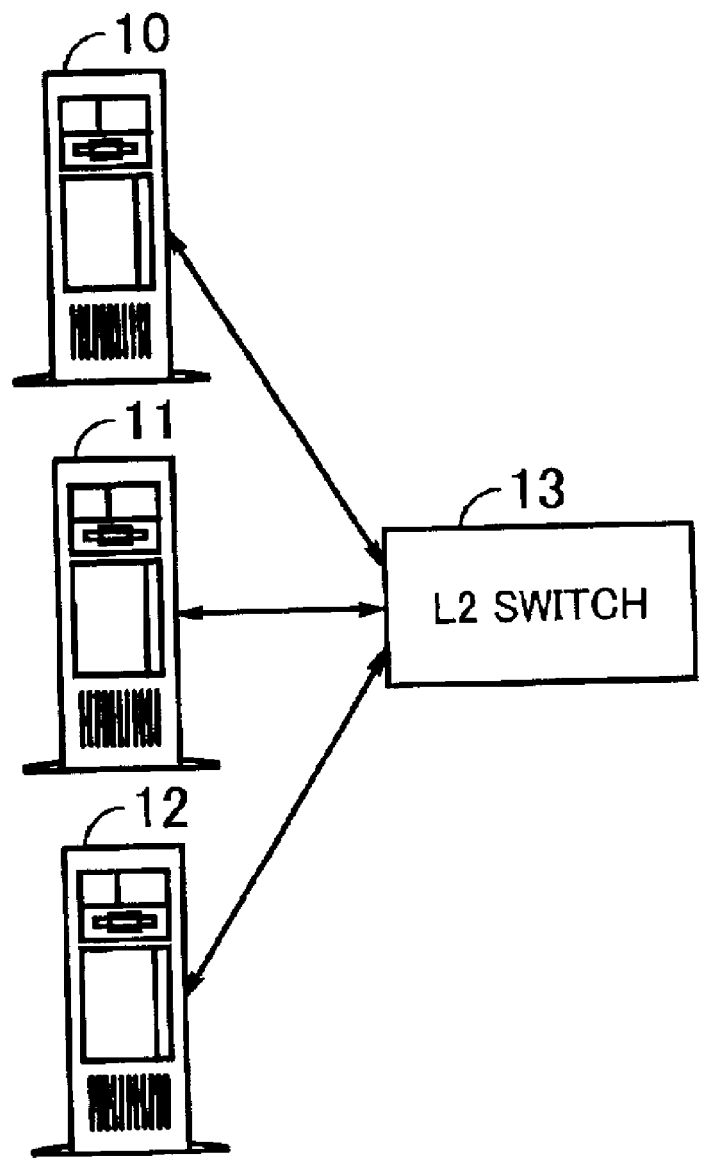
FIG. 11 is a diagram illustrating an example of a configuration of a conventional packet transmission system.
Figure 14:
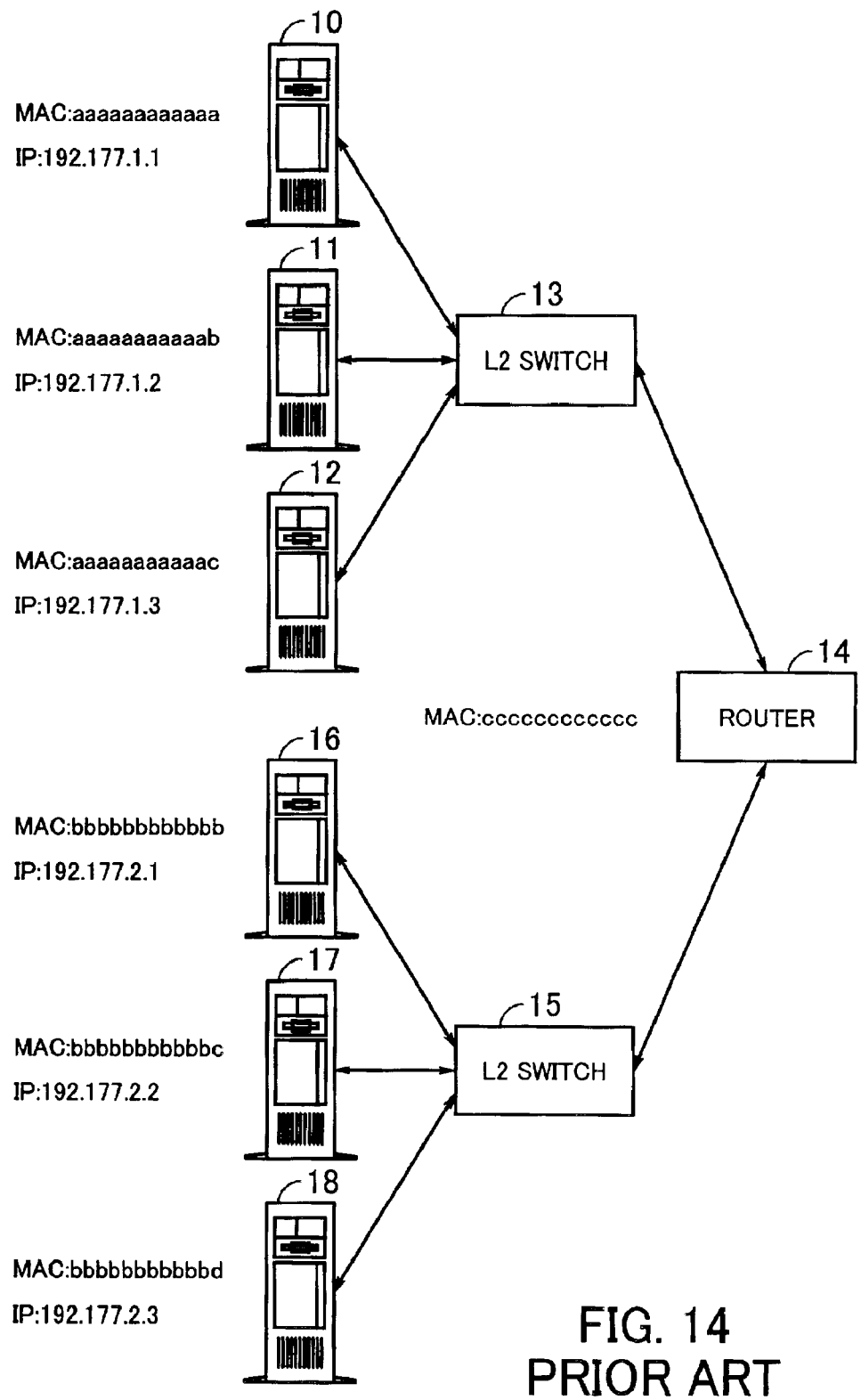
FIG. 14 is a diagram illustrating an example of a configuration of a conventional packet transmission system which includes a router.
Figure 15:
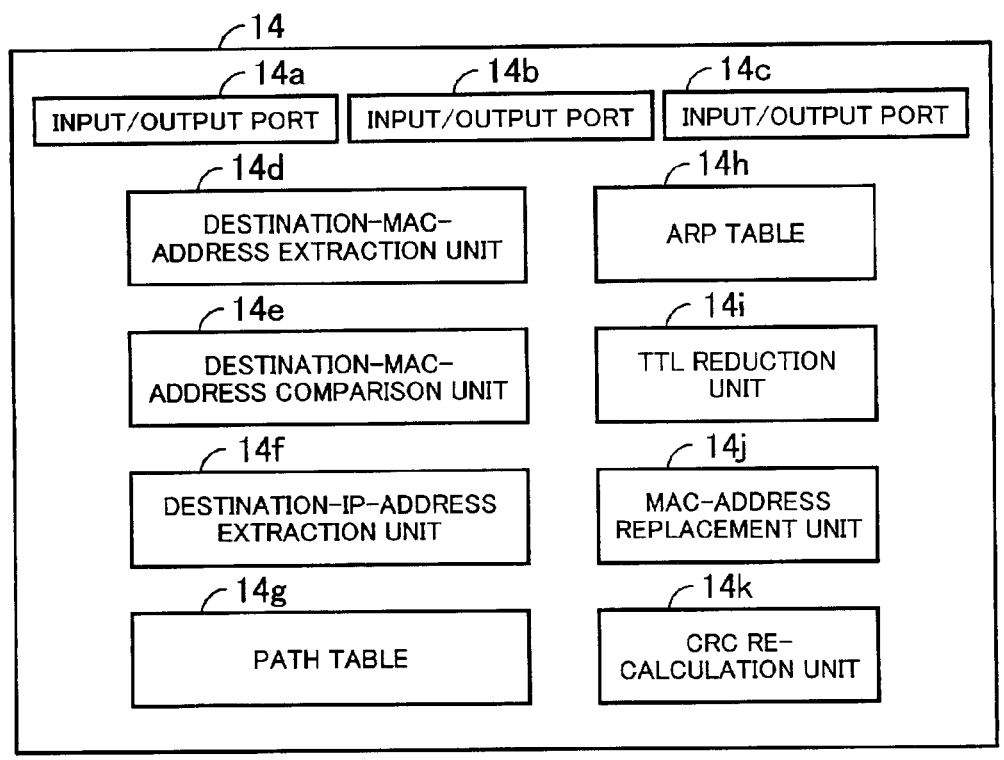
FIG. 15 is a diagram illustrating an example of a construction of a conventional router used in the conventional packet transmission system of FIG. 14.
Figure 18:
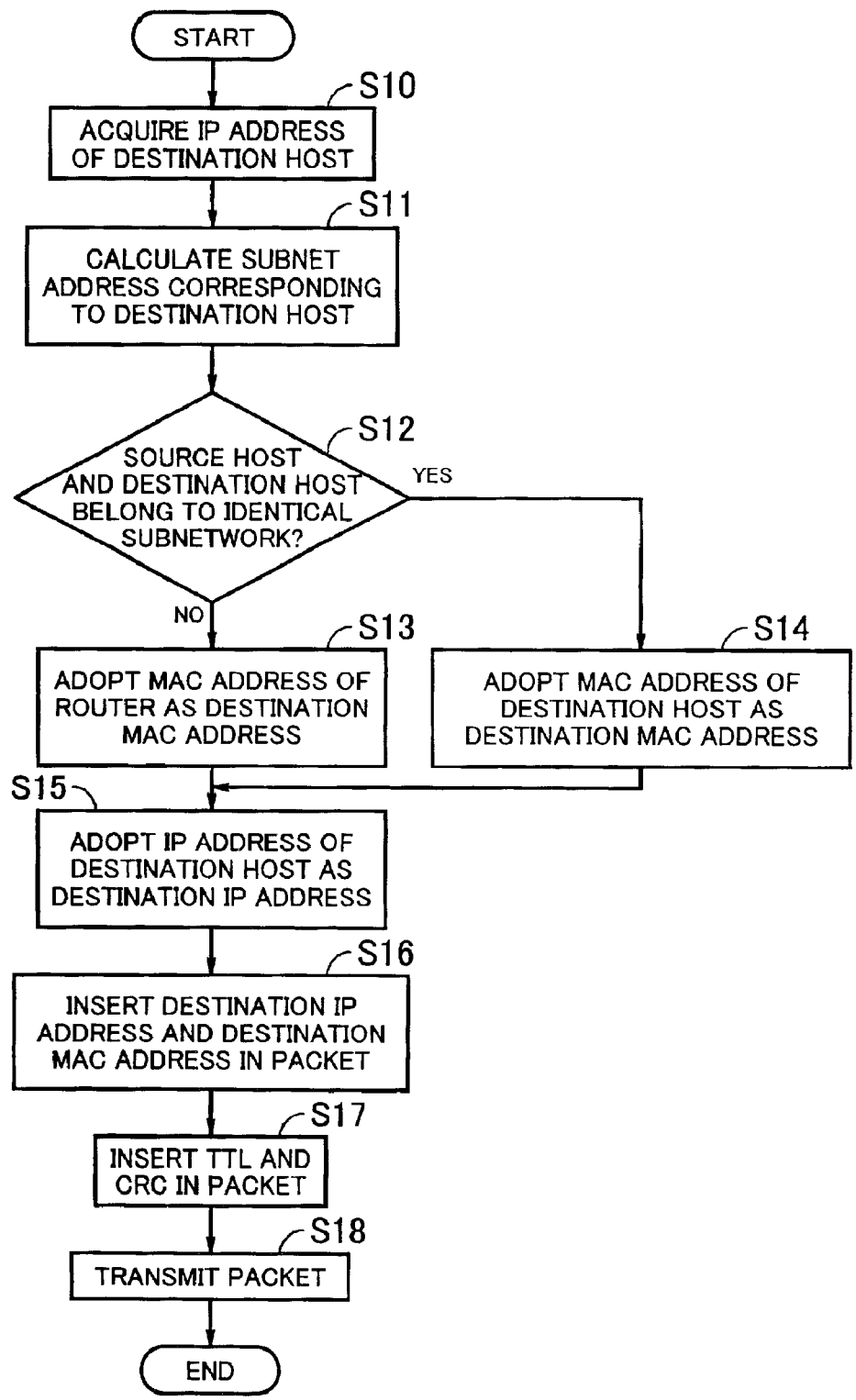
FIG. 18 is a flow diagram illustrating an example of a sequence of operations performed by each of the hosts in the conventional packet transmission system of FIG. 14 when the host as a source host transmits a packet addressed to another host as a destination host.
Figure 19:
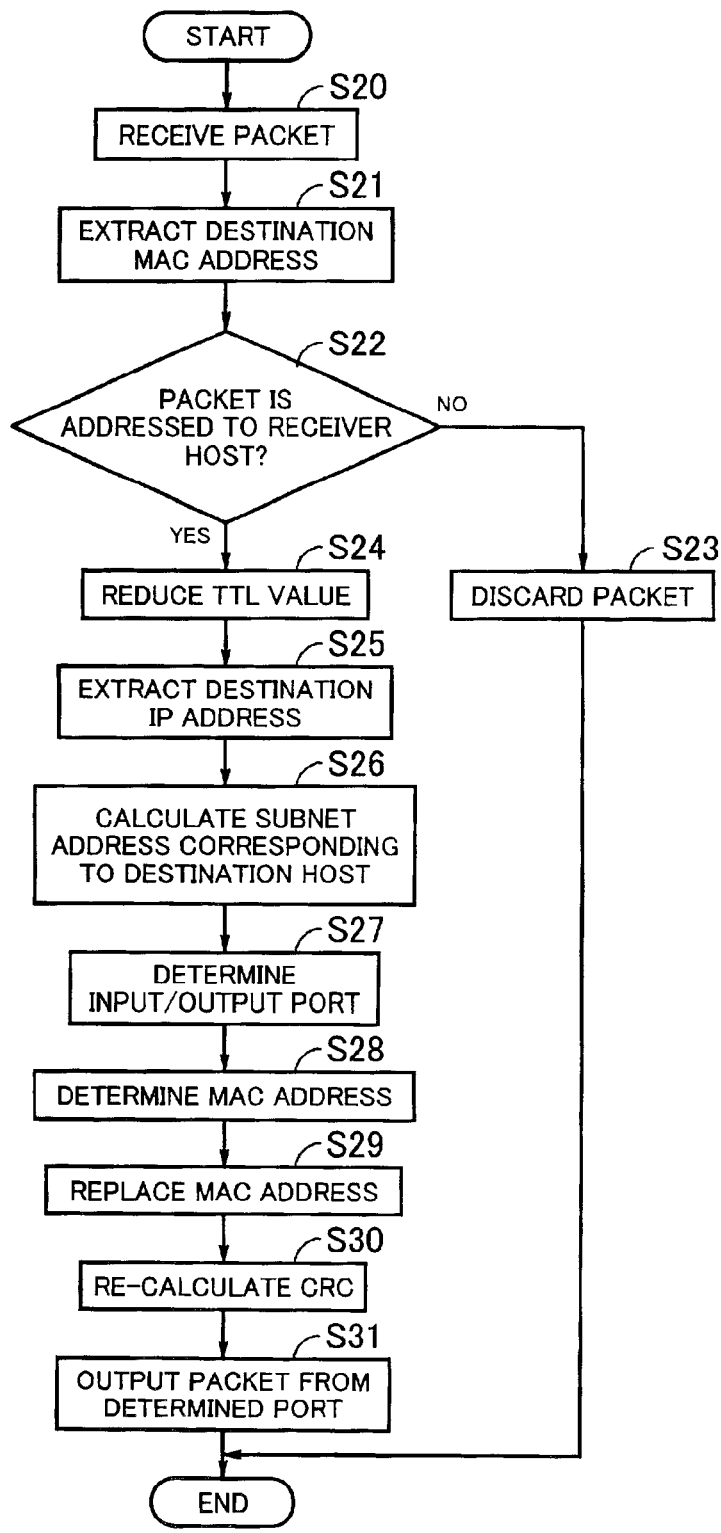
FIG. 19 is a flow diagram illustrating an example of a sequence of operations performed by the router in the conventional packet transmission system of FIG. 14 when the router transfers a packet.
Figure 20:
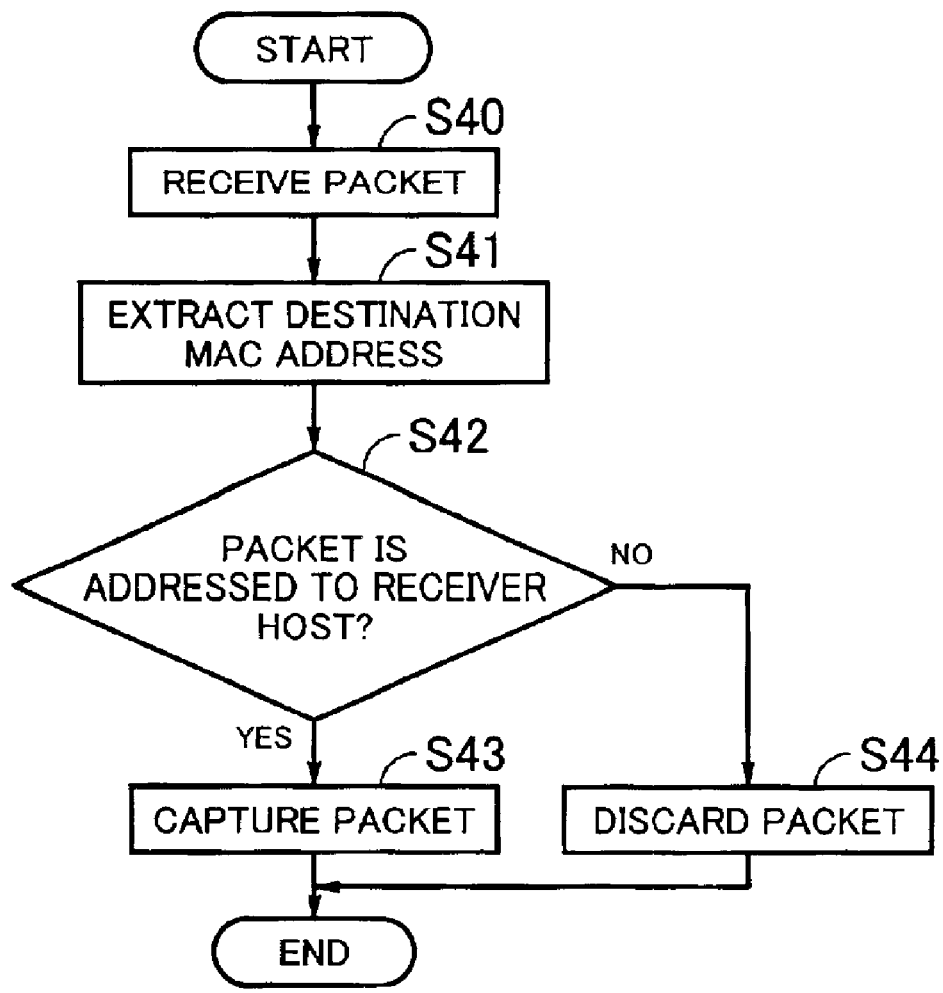
FIG. 20 is a flow diagram illustrating an example of a sequence of operations performed by each of the hosts in the conventional packet transmission system of FIG. 14 when the host as a receiver host receives a packet.

FIG. 10 is a flow diagram illustrating an example of a sequence of operations performed by each of the hosts 20 to 28 (in FIG. 2) when the host receives a packet. In the following explanation, the host which receives the packet is referred to as a receiver host.

In step S80, the CPU 20a of the receiver host receives a packet through the interface 20f. In step S81, the CPU 20a of the receiver host extracts a destination MAC address from the received packet. In step S82, the CPU 20a of the receiver host compares the extracted destination MAC address with a MAC address of the receiver host, and determines whether or not the received packet is directed to the receiver host.

When yes is determined in step S82, the operation goes to step S83. When no is determined in step S82, the operation goes to step S84. In step S83, the CPU 20a of the receiver host captures the received packet, and stores the received packet in, for example, RAM 20c. In step S84, the CPU 20a of the receiver host discards the received packet. Thus, the sequence of operations of the receiver host for receiving a packet is completed.

(10) Variations and Other Matters (i) Although only two (second-level) subnetworks are indicated in FIG. 2 in the above embodiment, it will be easily understood that the present invention can be applied to a network including any number of subnetworks.

(ii) The construction of the router illustrated in FIG. 4 can be realized by a semiconductor device.

(iii) Although the TTL reduction is not performed in the above embodiment, the TTL reduction may be performed since the processing for the TTL reduction is simple compared with the processing for the CRC calculation and the like.

(iv) The functions of the present invention described above can be realized by a computer or computers. The functions of each host or router can be written as a program, which can be stored in a computer-readable storage medium. The functions can be realized by a computer which executes the program. The computer-readable storage medium may be a magnetic storage device, a magnetic recording medium, an optical disk, an optical magnetic recording medium, a semiconductor memory, or the like. The magnetic storage device may be a hard disk device (HDD) or the like. The magnetic recording medium may be a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Readable)/RW (ReWritable), or the like. The optical magnetic recording medium may be an MO (Magneto-Optical Disk) or the like.

In order to put the program into the market, the program may be stored in a portable storage medium such as a DVD and a CD-ROM. Alternatively, the programs can be stored in a storage device belonging to a server computer, and transferred to another computer through a network.

In order to execute the program by a computer, the program, which is recorded in a portable storage medium or transferred from a server computer, is stored in a storage belonging to the computer. Then, the computer reads the program from the storage, and executes processing in accordance with the program.

In addition, the computer can directly read the program from the portable storage medium, and immediately execute processing in accordance with the program. Alternatively, the computer can execute processing in accordance with each program every time the computer receives the program from the server computer.

(v) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(vi) All of the contents of the Japanese patent application, No. 2001-132254 are incorporated into this specification by reference.

What is claimed is:

1. A packet transmission system comprising:
at least one first host apparatus belonging to a first host group;
at least one second host apparatus belonging to a second host group; and
a router which transfers packets between said first at least one host apparatus and said second at least one host apparatus;
each of said at least one first host apparatus in said first host group comprises,
an insertion unit which inserts in a packet an IP address and a link-layer address of a destination host apparatus of the packet, where said destination host apparatus belongs to said second host group, and
a first transmission unit which transmits said packet in which said IP address and said link-layer address are inserted;
said router comprises,
a plurality of ports each of which is connected to at least one host apparatus;
a storage unit which stores a plurality of identifiers of said plurality of ports and a plurality of subnet addresses of a plurality of subnetworks at a predetermined level in a network hierarchy corresponding to the plurality of ports;
a reception unit which receives a packet transmitted from a source host;
a destination-IP-address extraction unit which extracts a destination IP address from said packet received by said reception unit;
a subnet-address determination unit which determines one of said plurality of subnet addresses of said plurality of subnetworks to which said destination IP address extracted by said destination-IP-address extraction unit corresponds;
a port determination unit which determines one of said plurality of ports corresponding to said one of said plurality of subnet addresses determined by said subnet-address determination unit, by referring to said storage unit, and
a transmission unit which transmits said packet received by said reception unit, from said one of said plurality of ports determined by said port determination unit, while maintaining a same destination link-layer address as that in said received packet.

2. A packet transmission system according to claim 1, wherein each of said at least one first host apparatus in said first host group further comprises a unit which determines whether or not said destination host apparatus belongs to a subnetwork at a first predetermined level in a network hierarchy, based on said IP address of the destination host apparatus and a first subnet mask.

3. A packet transmission system according to claim 1, wherein said router further comprises a unit which determines a subnet address of a subnetwork at a second predetermined level in a network hierarchy to which said destination host apparatus belongs, based on said IP address of the destination host apparatus and a second subnet mask.

4. A packet transmission system comprising:
a plurality of host apparatuses; and
at least one router which transfers packets between said plurality of host apparatuses;
each of said plurality of host apparatuses comprises,
a first storage unit which stores IP addresses of host apparatuses belonging to a first subnetwork at a first predetermined level in a network hierarchy and link-layer addresses corresponding to the IP addresses,
a first determination unit which determines whether or not a destination host apparatus of a packet belongs to said first subnetwork,
a link-layer address acquisition unit which acquires from said first storage unit a link-layer address of said destination host apparatus based on an IP address of said destination host apparatus when said first determination unit determines that said destination host apparatus belongs to said first subnetwork,
an insertion unit which inserts in said packet said IP address of said destination host apparatus as a destination IP address and said link-layer address of said destination host apparatus as a destination link-layer address, and
a first transmission unit which transmits said packet in which said destination IP address and said destination link-layer address are inserted;
each of said at least one router comprises,
a plurality of ports each of which is connected to at least one host apparatus;
a storage unit which stores a plurality of identifiers of said plurality of ports and a plurality of subnet addresses of a plurality of subnetworks at a predetermined level in a network hierarchy corresponding to the plurality of ports;
a reception unit which receives a packet transmitted from a source host;
a destination-IP-address extraction unit which extracts a destination IP address from said packet received by said reception unit;
a subnet-address determination unit which determines one of said plurality of subnet addresses of said plurality of subnetworks to which said destination IP address extracted by said destination-IP-address extraction unit corresponds;
a port determination unit which determines one of said plurality of ports corresponding to said one of said plurality of subnet addresses determined by said subnet-address determination unit, by referring to said storage unit; and
a transmission unit which transmits said packet received by said reception unit, from said one of said plurality of ports determined by said port determination unit, while maintaining a same destination link-layer address as that in said received packet.

5. A packet transmission system according to claim 4, wherein said link-layer address is a MAC (Media Access Control) address.

6. A packet transmission system according to claim 4, wherein said first determination unit uses a first subnet mask in order to determine whether or not said destination host apparatus of said packet belongs to said first subnetwork, said second determination unit uses a second subnet mask in order to determine one of said plurality of subnet addresses of said plurality of second subnetworks to which said destination IP address extracted by said destination-IP-address extraction unit corresponds, and the first and second subnet masks have different lengths.

7. A packet transmission system according to claim 4, wherein each of said at least one router comprises a discard unit which discards said packet received by said reception unit, as necessary.

8. A host apparatus for transmitting a packet to a destination host apparatus, comprising:
- a plurality of ports each of which is connected to at least one other host apparatus;
- a storage unit which stores a plurality of identifiers of said plurality of ports and a plurality of subnet addresses of a plurality of subnetworks at a predetermined level in a network hierarchy corresponding to the plurality of ports;
- a reception unit which receives a packet transmitted from a source host;
- a destination-IP-address extraction unit which extracts a destination IP address from said packet received by said reception unit;
- a subnet-address determination unit which determines one of said plurality of subnet addresses of said plurality of subnetworks to which said destination IP address extracted by said destination-IP-address extraction unit corresponds;
- a port determination unit which determines one of said plurality of ports corresponding to said one of said plurality of subnet addresses determined by said subnet-address determination unit, by referring to said storage unit; and
- a transmission unit which transmits said packet received by said reception unit, from said one of said plurality of ports determined by said port determination unit, while maintaining a same destination link-layer address as that in said received packet.

9. A router for transferring a packet between a plurality of host apparatuses, comprising:
- a plurality of ports each of which is connected to at least one host apparatus;
- a storage unit which stores a plurality of identifiers of said plurality of ports and a plurality of subnet addresses of a plurality of subnetworks at a predetermined level in a network hierarchy corresponding to the plurality of ports;
- a reception unit which receives a packet transmitted from a source host;
- a destination-IP-address extraction unit which extracts a destination IP address from said packet received by said reception unit;
- a subnet-address determination unit which determines one of said plurality of subnet addresses of said plurality of subnetworks to which said destination IP address extracted by said destination-IP-address extraction unit corresponds;
- a port determination unit which determines one of said plurality of ports corresponding to said one of said plurality of subnet addresses determined by said subnet-address determination unit, by referring to said storage unit; and
- a transmission unit which transmits said packet received by said reception unit, from said one of said plurality of ports determined by said port determination unit, while maintaining a same destination link-layer address as that in said received packet.

10. A semiconductor device for use in a router having a plurality of ports each of which is connected to at least one host apparatus, and transferring a packet between host apparatuses, said semiconductor device, when used with said router, makes the router comprise;
- a storage unit which stores a plurality of identifiers of said plurality of ports and a plurality of subnet addresses of a plurality of subnetworks at a predetermined level in a network hierarchy corresponding to the plurality of ports;
- a reception unit which receives a packet transmitted from a source host;
- a destination-IP-address extraction unit which extracts a destination IP address from said packet received by said reception unit;
- a subnet-address determination unit which determines one of said plurality of subnet addresses of said plurality of subnetworks to which said destination IP address extracted by said destination-IP-address extraction unit corresponds;
- a port determination unit which determines one of said plurality of ports corresponding to said one of said plurality of subnet addresses determined by said subnet-address determination unit, by referring to said storage unit; and
- a transmission unit which transmits said packet received by said reception unit, from said one of said plurality of ports determined by said port determination unit, while maintaining a same destination link-layer address as that in said received packet.

* * * * *